United States Patent
Veith et al.

(10) Patent No.: US 7,268,940 B2
(45) Date of Patent: Sep. 11, 2007

(54) ILLUMINATING DEVICE

(75) Inventors: Michael Veith, Wetzlar (DE); Lambert Danner, Wetzlar-Naunheim (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 0 days.

(21) Appl. No.: 10/475,559

(22) PCT Filed: Apr. 10, 2002

(86) PCT No.: PCT/EP02/03974

§ 371 (c)(1),
(2), (4) Date: Oct. 21, 2003

(87) PCT Pub. No.: WO02/086580

PCT Pub. Date: Oct. 31, 2002

(65) Prior Publication Data

US 2004/0136057 A1    Jul. 15, 2004

(30) Foreign Application Priority Data

Apr. 23, 2001   (DE) ................................. 101 19 992

(51) Int. Cl.
*G02B 21/06*    (2006.01)
*G02B 21/16*    (2006.01)

(52) U.S. Cl. ....................... 359/388; 359/368; 348/131; 356/237.2; 362/293

(58) Field of Classification Search ................ 359/368, 359/385, 386, 388, 389, 390, 634, 890; 348/79, 348/86, 87, 92, 125, 126, 131; 356/237.2, 356/237.3, 237.4, 237.5
See application file for complete search history.

(56) References Cited

U.S. PATENT DOCUMENTS

| 2,881,663 | A | * | 4/1959 | Dearborn ..................... 359/861 |
| 3,498,693 | A | * | 3/1970 | Fein et al. ................... 359/317 |
| 4,088,884 | A | * | 5/1978 | Rast et al. ................... 398/131 |
| 4,487,478 | A | * | 12/1984 | Jackson ....................... 359/601 |
| 4,669,811 | A | * | 6/1987 | McQuoid ...................... 359/15 |
| 5,625,494 | A | * | 4/1997 | Fukushima ................... 359/634 |
| 5,867,329 | A | | 2/1999 | Justus et al. ................ 359/861 |
| 6,339,498 | B1 | | 1/2002 | Nishida et al. ............. 359/361 |
| 6,624,930 | B1 | | 9/2003 | Danner et al. .............. 359/359 |

FOREIGN PATENT DOCUMENTS

| DE | 19931954 | 1/2001 |
| EP | 1069449 | 1/2001 |
| JP | 54103060 | 8/1979 |
| JP | 08313728 | 3/1997 |
| JP | 2001013319 | 1/2001 |

* cited by examiner

*Primary Examiner*—Mark A. Robinson
(74) *Attorney, Agent, or Firm*—Darby & Darby

(57) ABSTRACT

An illuminating device, as for a microscope, includes a light source and a reflecting filter system. The beam of light of the light source undergoes a plurality of reflections in the reflecting filter system. The entering beam of the reflecting filter system has an optical beam offset and/or a change in direction relative to the exiting beam.

15 Claims, 7 Drawing Sheets

ILLUMINATING DEVICE

The present invention relates to an illuminating device which is preferably used for a microscope, in particular for a UV microscope or an optical device having imaging optics, and which includes a light source and a reflecting filter system; the beam of light of the light source undergoing several reflections in the reflecting filter system.

BACKGROUND

Illuminating devices of the type described are known, for example, from German Patent Application DE 199 31 954 A1. This illuminating device is used as a light source and wavelength selection device for a DUV (=deep ultra-violet) microscope. Illuminating devices for DUV microscopes must provide illuminating light of a narrow illumination wavelength range for which the microscope optics are corrected. The illumination wavelength range is characterized by the spectral position of the intensity maximum and the half-value width thereof. Known systems for selecting the desired illumination wavelength range from a spectrum of a suitable light source, such as a mercury vapor lamp, include both narrow-band transmission filter systems and reflecting filter systems. These filter systems are arranged in the illumination beam path and feed light of the selected to the illumination wavelength range to the microscope as useful light.

Narrow-band transmission filter systems in the DUV provide peaks having a very narrow half-value width; however, the maximum transmission and, thus, the maximum value of the peaks, is only about 20% of the input optical power present upstream of narrow-band transmission filter system. Therefore, narrow-band transmission filter systems do not constitute efficient wavelength selection devices for DUV light.

The known reflecting filter systems are composed of several reflecting filters on which the light of the light source is incident at a certain angle of incidence and at which it is reflected. In these reflecting filter systems, the reflected and thus useful component of the light of the selected illumination wavelength range is considerably more than 90% of the input optical power.

In the reflecting filter system known from German Patent Application DE 199 31 954 A1, provision is made for an arrangement of reflecting filters in which the angles of reflection at the individual reflecting filters are smaller than 30°. This makes it possible to produce a half-value width of the selected illumination wavelength range of smaller than 20 nm. Using such a reflecting filter system with small angles of incidence, the optical power exiting the reflecting filter system can be about 98% of the input optical power, depending on the type of reflecting filters used.

FIG. 1 from German Patent Application DE 199 31 954 A1 shows such an illuminating device together with a DUV microscope. In this context, the reflecting filter system is arranged between the light source and the DUV microscope, which by itself requires an enormous amount of space. If the DUV microscope is used as a semiconductor inspection microscope, it must be installed and operated in a clean room. Since the expenditure for operating a clean room increases considerably with increasing volume, the equipment installed there must be arranged in the most space-saving way possible, ideally requiring only a small footprint.

It is often necessary to use several illuminating light sources in an optical system and particularly in a microscope system, the illuminating light sources in each case having an illumination wavelength range extending from the infrared via the visual to the DUV wavelength ranges. To this end, usually, up to three different light sources along with the lamp housings are integrated opto-mechanically, which can only be accomplished using a number of deflection mirrors and/or points of beam combination in the illumination optics and disadvantageously involves an enlargement or increase in the number of optical beam paths.

SUMMARY OF THE INVENTION

Therefore, an object of the present invention is to provide an illuminating device in which the spatial dimensions of the illuminating device are relatively small.

The present invention provides an illuminating device including a light source and a reflecting filter system. The beam of light of the light source undergoes a plurality of reflections in the reflecting filter system. The entering beam of the reflecting filter system has an optical beam offset and/or a change in direction relative to the exiting beam.

According to the present invention, it was initially recognized that the spatial dimensions of the illuminating device can be reduced by implementing an optical beam offset. Thus, unlike the exemplary embodiment from FIG. 1 of German Patent Application DE 199 31 954 A1, there is no need for a linear arrangement of the light source and the reflecting filter system, but rather it is possible for the light source to be arranged above, below or laterally offset from the optical axis of the microscope. Especially semiconductor inspection microscopes usually have a very large specimen stage. This specimen stage must be capable of positioning the now very large semiconductor products—wavers—relative to the objective lens of the microscope in such a manner that all regions of the semiconductor product can be inspected photo-optically. Therefore, an arrangement of a light source combined with an optimized optical beam path is only possible above or below the microscope stage. As already mentioned, there is not an arbitrary amount of space available on the side of the microscope facing away from the microscope operator.

Thus, the requirements on an overall system with respect to minimizing its spatial dimensions because of the implementation in a clean room are largely predetermined by the buyer. In this respect, an illuminating device according to the present invention having an optical beam offset between the entering beam and the exiting beam allows an arrangement of the illuminating device on the microscope that meets these requirements.

A reduction of the dimensions of the illuminating device can advantageously also be achieved by a change in direction between the entering beam and the exiting beam of the reflecting filter system. Because of this, it is possible, for example, to arrange a light source laterally next to the upper part of the microscope stand; the light source emitting light in a direction extending to the rear, as viewed by the operator of the microscope. If a change in direction between the entering beam and the exiting beam is implemented, the illuminating light which has been selected with respect to the illumination wavelength range could be laterally coupled into the microscope after passing through the reflecting filter system. It can be a very particular advantage to combine an optical beam offset and a change in direction between the entering beam and the exiting beam of the reflecting filter system, so that, for example, a light source can also be arranged above the microscope stand, for example, in the rear region of the microscope, as viewed by the user.

In an embodiment, provision is made for the angle of reflection to be at least nearly identical for each reflection in the reflecting filter system. This allows the use of identical reflecting filters, which advantageously simplifies manufacture and reduces the production costs.

In another embodiment, provision is made for a further reflecting filter system which is arranged in such a manner that it can be switched to the first reflecting filter system. This allows the selection of a different wavelength or wavelength range of the light source using the further reflecting filter system, so that the number of required light sources can be reduced in a particularly advantageous manner. Specifically, the reflecting filter systems could be arranged in such a manner that the light of the light source can be guided through either one or the other reflecting filter system using deflection devices or switchable mirrors. Also provided is the use of one or more 50:50 beam splitters, dichroic beam splitters, or the like, which simultaneously guide(s) light of the light source to at least two reflecting filter systems. In this manner, the illuminating device would provide simultaneous illumination with several different wavelengths or wavelength ranges.

In an embodiment, the reflecting filter systems are arranged in such a manner that either one or the other reflecting filter system is brought into the optical beam path. This could be accomplished, for example, using filter slide blocks in a suitable mechanical guide. This switching could be accomplished mechanically and/or by motor power, it being desirable for an illumination device for a semiconductor inspection microscope to have a motor-driven switching mechanism.

The switchably arranged reflecting filter systems are particularly advantageously configured in such a manner that in each active position in the optical beam path, the images of the light source each have the same position and size in the optical beam path. In this manner, the design of the overall system can be further simplified in an advantageous manner.

If the intention is to use the illuminating device for a VIS or IR microscope or for a UV or DUV microscope, the light source is arranged in a housing. In this context, this housing or lamp housing contains diverse optical components, such as adjusting means, a reflector, and a collector. In this respect, the light of the light source leaving the lamp housing usually has a nearly collimated beam path. The reflecting filter system or systems could also be arranged in a housing. In particular when using the illuminating device in the field of microscopy, a modular design of the individual components, as is usual in this field, is achieved in this manner. In order to mount the individual components on the microscope, the lamp housing and the housing of the reflecting filter system or systems have a, preferably standard, mechanical interface. Thus, the housings of the illuminating device can be easily adapted to different microscopes or other devices, such as slide projectors.

In a preferred embodiment, the light propagates in an at least substantially collimated manner in the reflecting filter system and/or when exiting the reflecting filter system. This measure, too, allows easy adaptation to the beam path of a microscope or of a slide projector. This also ensures that the light beam, which propagates in a collimated manner, has approximately the same beam cross-section before and after a reflection in the reflecting filter system so that in the case of several reflections in the reflecting filter system, the optical components must be geared to the same beam diameter or beam cross-section in terms of their spatial dimensions.

In a preferred embodiment, the reflecting filter system contains reflecting filters which are preferably designed as reflecting notch filters. In this case, a reflecting filter system is provided with reflecting filters of identical design, which are made, for example, of black glass and coated by vapor deposition; such a reflecting filter having a reflection coefficient of nearly 1 at the wavelength to be selected. Important to semiconductor inspection microscopy is, in particular, light of the "i-line", i.e., UV light having a wavelength of 365 nm, as well as "DUV" light, i.e., light having a wavelength of 248 nm. The reflection coefficient of such a reflecting filter is very low for all other wavelengths so that the light of the wavelength that is not to be selected is suppressed with each reflection at a reflecting filter. In a concrete embodiment therefore, at least four reflecting filters are provided per reflecting filter system. After four reflections, the light of wavelength ranges that are not selected by the reflecting filter system is substantially suppressed so that, using the inventive illuminating device in conjunction with a UV or DUV microscope, it is possible to achieve a microscope image that is nearly free of color errors.

In an alternative embodiment, the reflecting filter system contains a transparent component. For internal reflection of the light, this transparent component has at least two boundary surfaces which are provided with a reflective coating. These reflective coatings could have a characteristic comparable to that of the reflecting notch filters. In view of multiple reflection in the transparent component, the boundary surfaces having a reflective coating are arranged opposite each other.

In a preferred embodiment, the transparent component is shaped in such a manner that the boundary surfaces are arranged nearly parallel or in a slight wedge shape with respect to each other. Thus, in the case of multiple reflection, a collimated beam shape in the transparent component is possible if the light entering the component also propagates in a collimated manner and if the boundary surfaces are arranged parallel to each other. If the boundary surfaces are arranged in a slight wedge shape with respect to each other, it is possible, by means of multiple reflection in the transparent component, to reduce or increase the beam diameter of the beam that exits the reflecting filter system compared to the beam diameter of the beam that enters the reflecting filter system, which advantageously allows adjustment of the beam shape without further optical components. In this context, the wedge angle of the boundary surfaces is to be selected such that even in the case of multiple reflections in the transparent component, light of the wavelength or wavelength range to be selected is still reflected with sufficient efficiency by the reflective coating of the respective boundary surfaces.

The transparent component could be substantially made of glass, quartz glass, CaF2, or of Plexiglas. If the intention is for the illuminating device to provide light of the UV wavelength range, the transparent component is substantially made of quartz glass.

The transparent component has entrance surfaces and exit surfaces for the light of the light source, the entrance and exit surfaces preferably being provided with an anti-reflective coating. In this manner, the portion of light that is reflected at the entrance or exit surfaces can advantageously be reduced to a great extent so that the anti-reflective coating allows further optimization of the luminous efficacy of the illuminating device.

In order to adjust the position of the image of the light source to the beam path of a microscope or an optical device having imaging optics, beam-shaping means are provided in the beam path of the reflecting filter system or in the housing thereof. These can be lenses or curved reflective surfaces. Ultimately, therefore, an adjustment to the requirements of the optical beam path of the downstream device can already be accomplished before the illuminating light selected by the reflecting filter system exits the illuminating device.

Also advantageously, passive and/or active means for cooling are provided in the illuminating device and, in particular, in the reflecting filter system. The light that is not reflected by the reflecting filter system is usually absorbed by light traps; the absorbed light being converted into heat. In order for the heat produced in the beam trap not to cause unwanted expansion of the other optical components or thermal damage, which could ultimately lead to an unstable optical beam path or to an unstable illumination situation, the provided means for cooling actively or passively dissipate the heat to the environment. The passive means for cooling could, for example, be cooling fins protruding from the housing of the reflecting filter system. The active means for cooling could, for example, include Peltier cooling.

Since the light of the wavelength range that is not to be selected is suppressed more effectively by multiple reflection in the reflecting filter system with increasing number of reflections, provision is made for at least two reflections in the reflecting filter system in order to select as narrow a band of illumination wavelengths as possible.

In a preferred embodiment, provision is made for an overall system including a microscope and the illuminating device according to the present invention. This microscope could be a UV microscope, a DUV microscope, a scanning microscope, a confocal or a double-confocal scanning microscope, or a fluorescence microscope. The overall system could, in particular, be a semiconductor inspection microscope and/or a semiconductor-measuring microscope.

BRIEF DESCRIPTION OF THE DRAWINGS

The present invention is elaborated upon below based on exemplary embodiments with reference to the drawings, in which.

DETAILED DESCRIPTION

Figure 1:
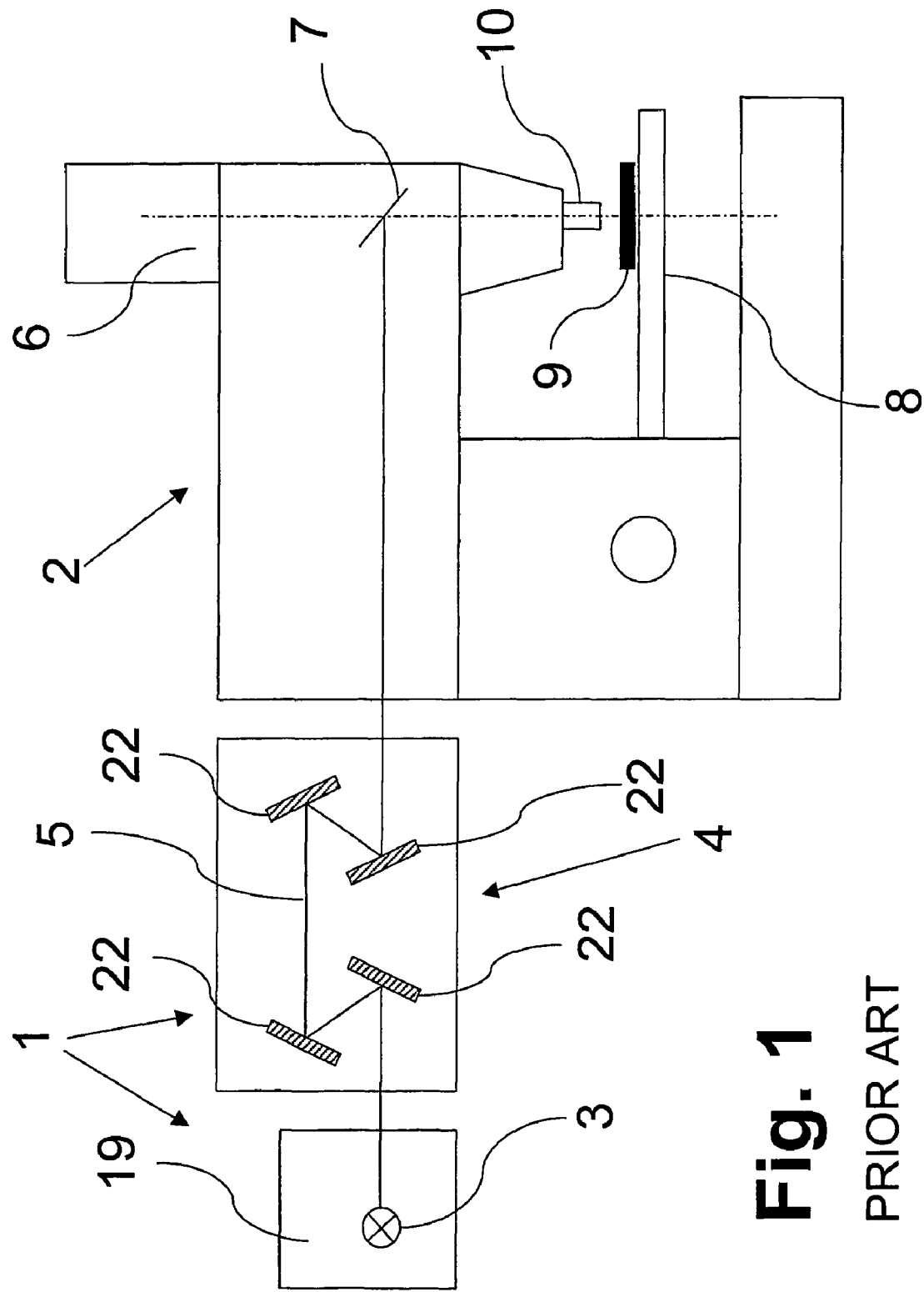
FIG. 1 is a schematic representation of an illuminating device known from the prior art, which is adapted to a DUV microscope.

FIG. 1 shows a schematic representation of an illuminating device 1 together with a DUV microscope 2, as known from the prior art. Illuminating device 1 has a light source 3 and a reflecting filter system 4. Beam 5 of the light of light source 3 undergoes several reflections in reflecting filter system 4. In this context, the angle of reflection is identical for each reflection in the reflecting filter system. DUV microscope 2 features a detector 6 which is designed as a TV camera. The illuminating light beam is divided by beam splitter 7. Object 9, which is arranged on microscope stage 8, is imaged by objective lens 10 to detector 6.

Figure 2:
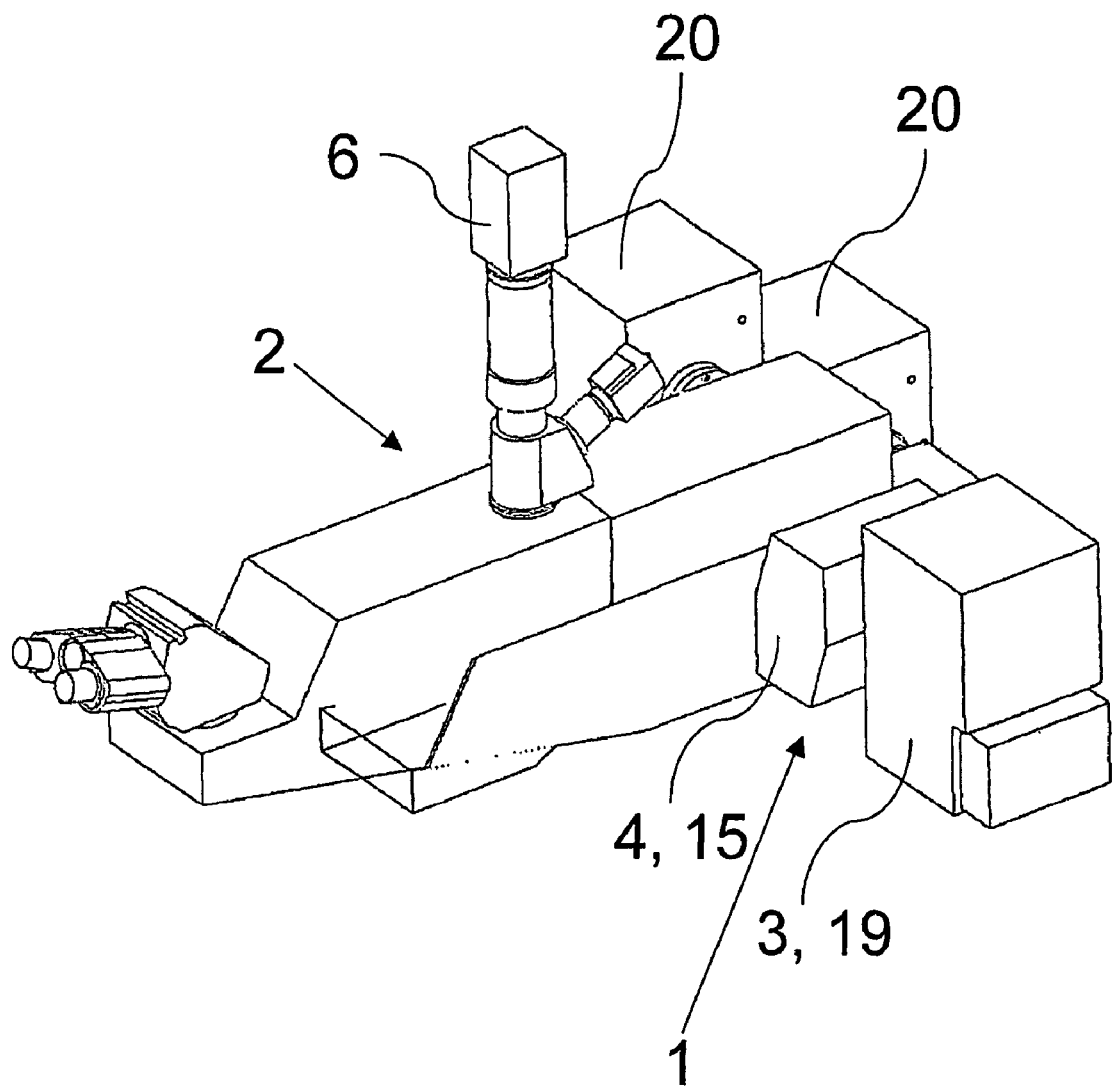
FIG. 2 shows a three-dimensional view of a first exemplary embodiment of an illuminating device according to the present invention, which is adapted to a DUV microscope.

FIG. 2 shows an exemplary embodiment of an inventive illuminating device 1 that is adapted to a semiconductor inspection microscope which is designed as a DUV microscope 2. This illuminating device 1 features a light source and a reflecting filter system; the beam path of the reflecting filter system being shown in greater detail in FIG. 3.

According to the present invention, reflecting filter system 4 of illuminating device 1 is designed in such a manner that entering beam 11 has an optical beam offset 13 relative to exiting beam 12. In this context, entering beam 11 of reflecting filter system 4 is associated with light source 3, which is not shown in FIG. 3. After passage through reflecting filter system 4, the selected illuminating light exits reflecting filter system 4 in the form of exiting beam 12 and enters DUV microscope 2, which is not shown in FIG. 3 either.

Figure 3:
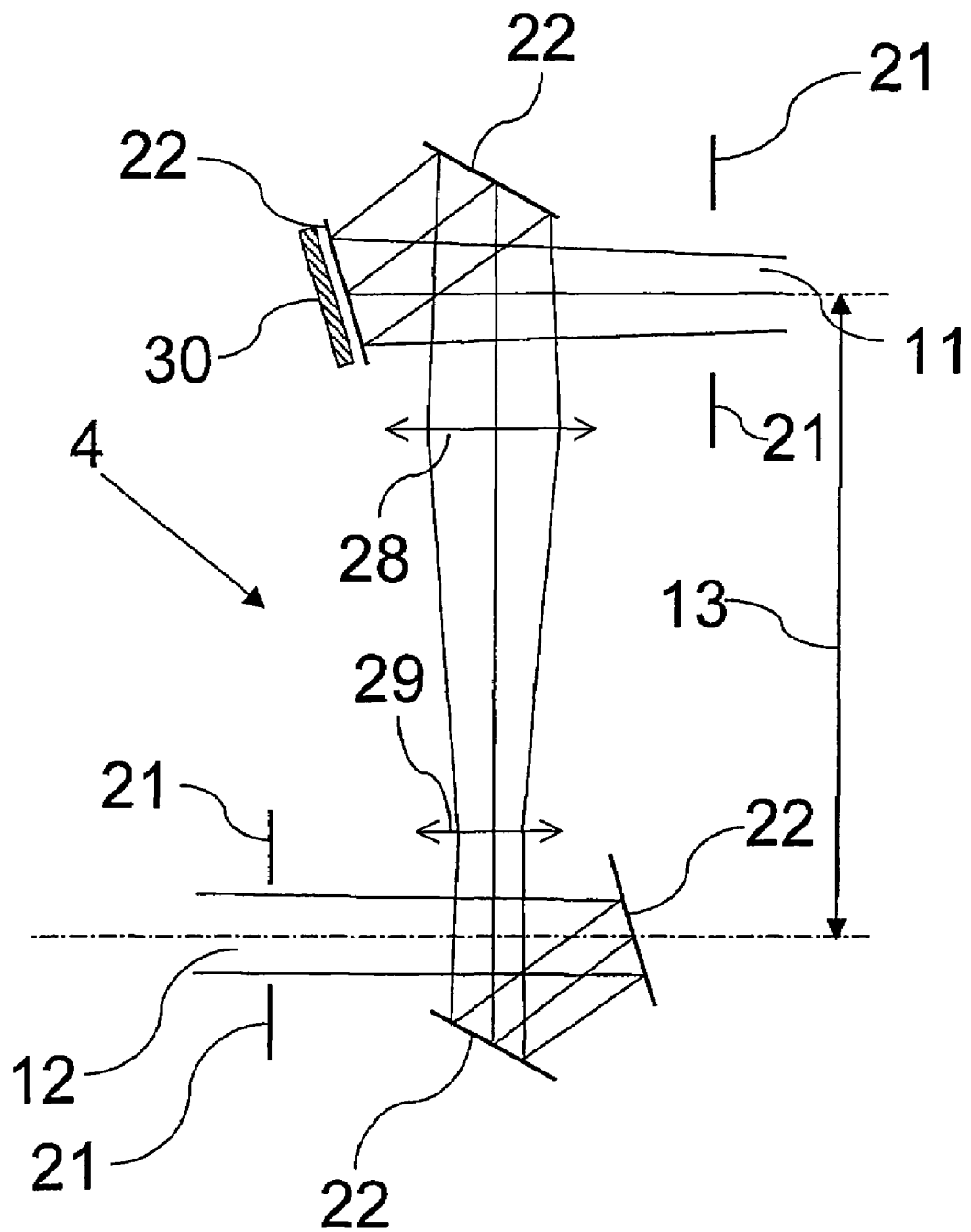
FIG. 3 shows the optical beam path of a reflecting filter system in a three-dimensional view.

Using reflecting filter system 4 from FIG. 3, it is possible to select light of the wavelength range of 365 nm±8 nm (i-line). Reflecting filter system 14, which is shown in FIG. 4, is used to select DUV light of the wavelength range of 248 nm±7 nm.

Figure 4:
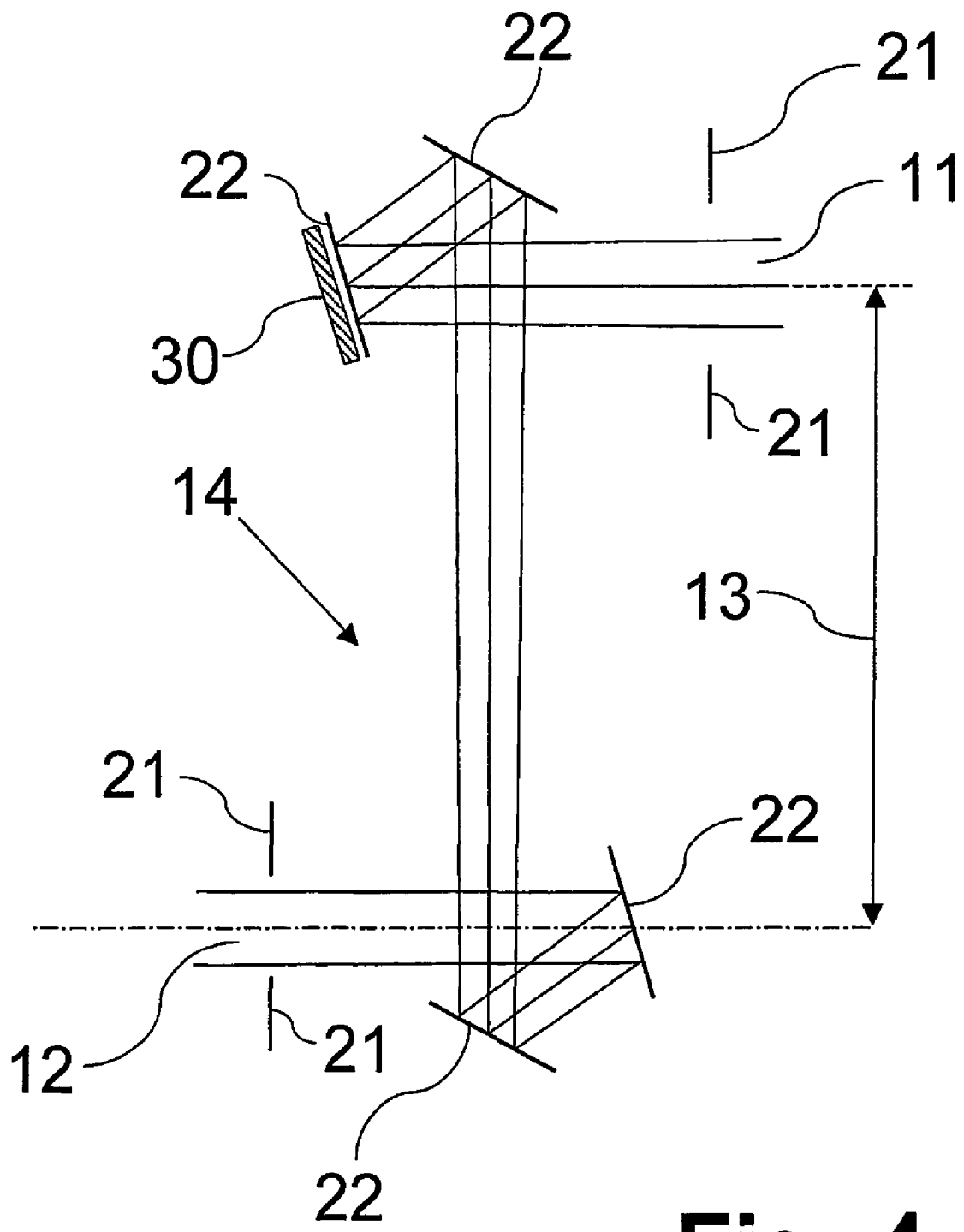
FIG. 4 shows the optical beam path of a further reflecting filter system in a three-dimensional view.

Reflecting filter system 4 from FIG. 3 and reflecting filter system 14 from FIG. 4 are both implemented in DUV microscope 2 shown in FIG. 2. In this context, the two reflecting filter systems are arranged in housing 15 in such a manner that they can be switched by motor power. In doing so, either reflecting filter system 4, which is designed to select the i-line, or reflecting filter system 14, which is designed to select the 248 nm line, are alternatively brought into the optical beam path as a whole.

Figure 5:
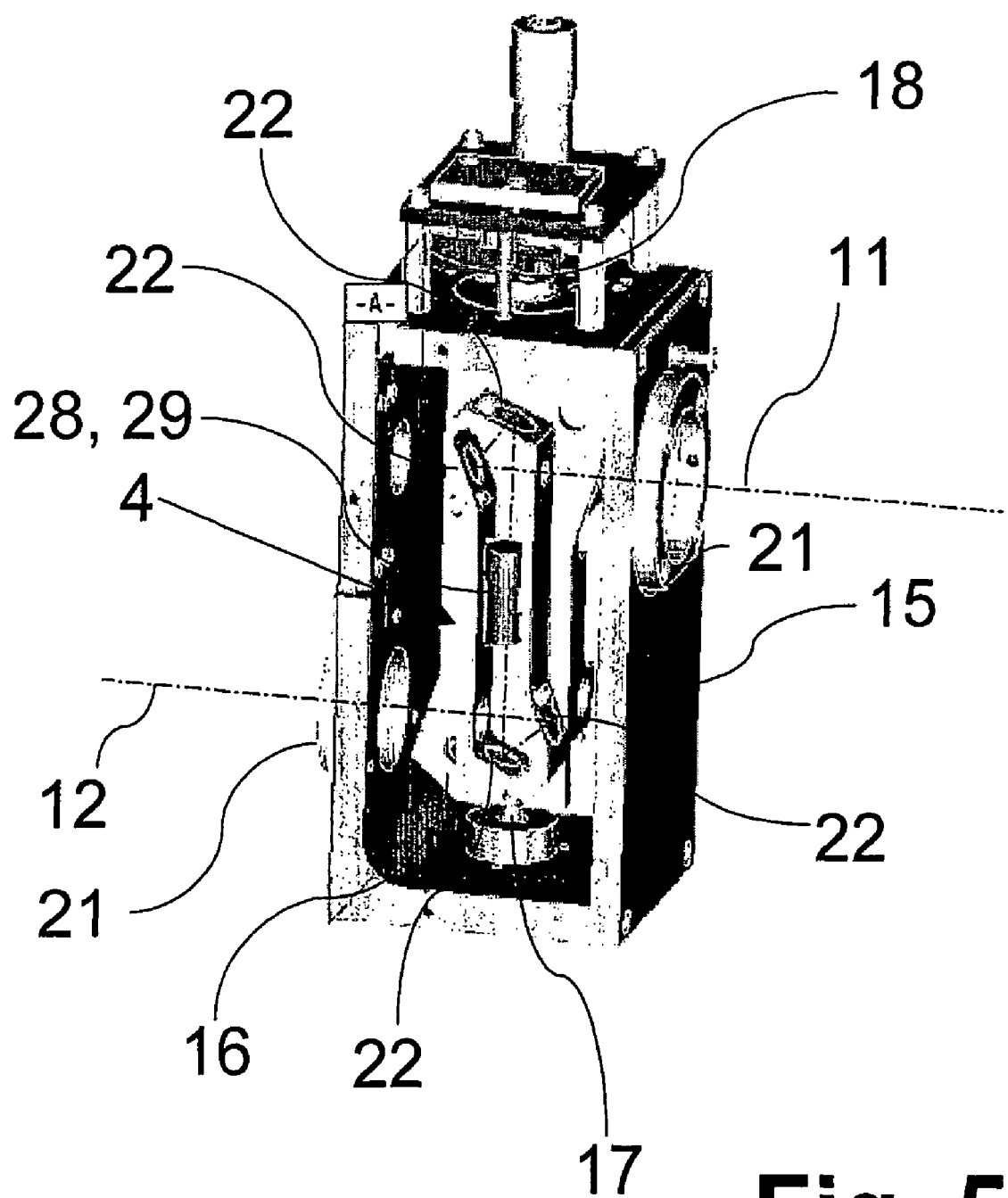
FIG. 5 shows a three-dimensional detailed view of an embodiment of a housing accommodating two reflecting filter systems.
Figure 6:
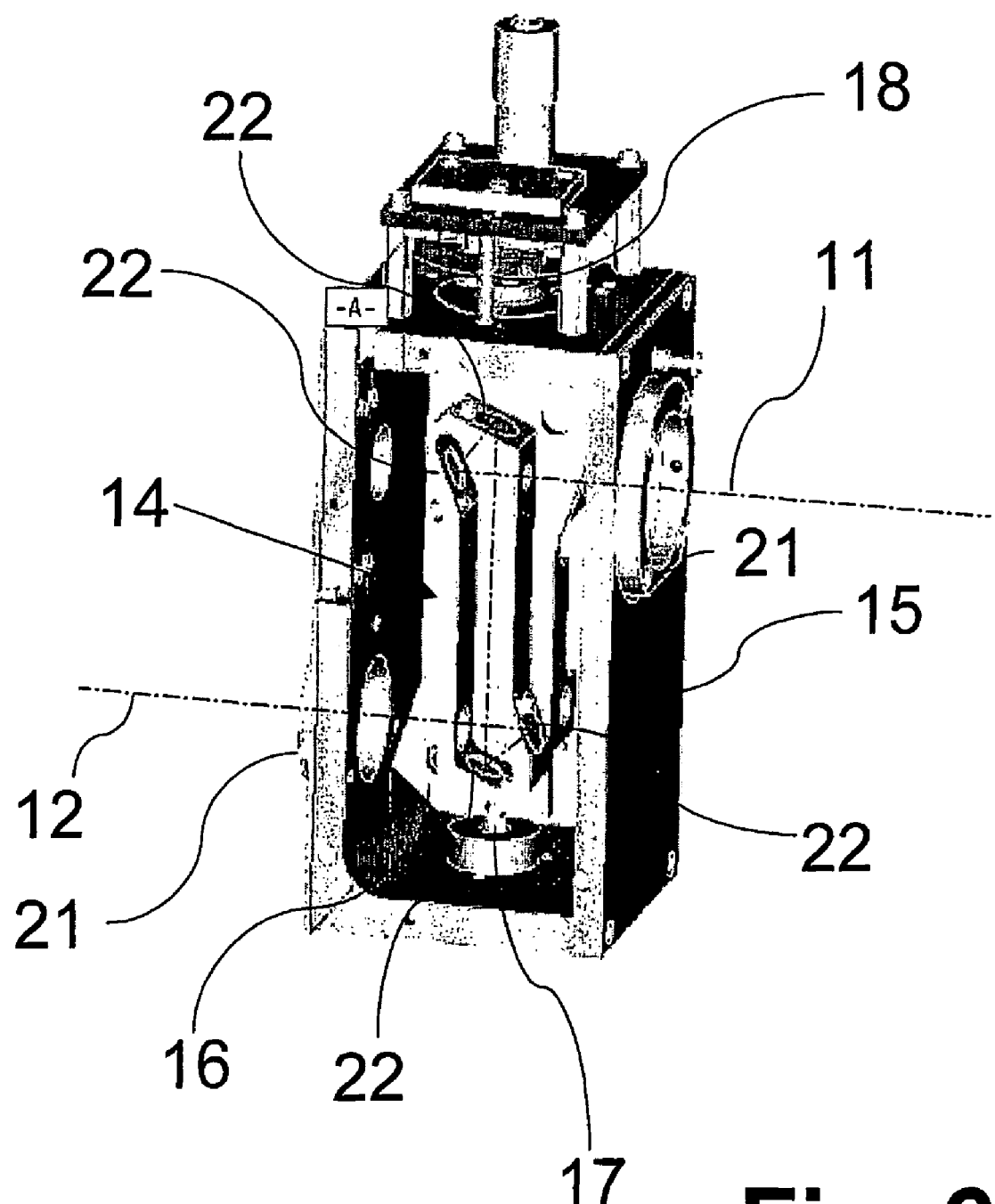
FIG. 6 shows the housing depicted in FIG. 5 in a different switching state.

FIGS. 5 and 6 are three-dimensional detailed views of the inside of the housing 15 depicted in FIG. 2. In the case of FIG. 5, reflecting filter system 4 from FIG. 3 is brought into the illuminating beam path. In FIG. 6, housing 15 from FIG. 5 is shown in an operating position in which reflecting filter system 14 from FIG. 4 is brought into the illuminating beam path. Both reflecting filter systems 4, 14 from FIGS. 5 and 6 are adapted on a plate 16. Plate 16 is rotatably mounted about an axis of rotation 17 and can be rotated by motor 18. In this connection, plate 16 is designed to have two rotational positions, namely one position at 0°, which is shown in FIG. 5, and the other position at 180°, which is shown in FIG. 6. Due to this space-saving, compact, and rugged design, either light of the wavelength 248 nm or light of the wavelength 365 nm can be selected or made available to the microscope as illuminating light using only one light source 3. In this context, it should be particularly pointed out that the space-saving design is further facilitated by the optical path in reflecting filter system 4, 14, the optical path being folded upon itself.

From FIG. 2, it can be seen that light source 3 is located in housing 19; further light sources (for the visual brightfield and white-light confocal modes) are located in the two other housings 20.

Mechanical interface 21 of the housing of the reflecting filter system is indicated in FIGS. 3 and 4, and also shown in FIGS. 5 and 6. Both the mechanical interface for adaptation to microscope 2 and that for adaptation to lamp housing 19 are standard and comply with the dimensions and modes of operation used in microscopy.

From FIGS. 3 and 4, it can be seen that both the light in reflecting filter system 4, 14 and the light entering or exiting reflecting filter system 4, 14 propagate in an at least substantially collimated manner. Reflecting filter systems 4, 14 each contain four reflecting filters 22, which are designed as reflecting notch filters. Accordingly, reflecting filters 22 from FIG. 3 reflect light of the wavelength 365 nm; reflecting filters 22 shown in FIG. 4 reflect light of the wavelength 248 nm.

Figure 7:
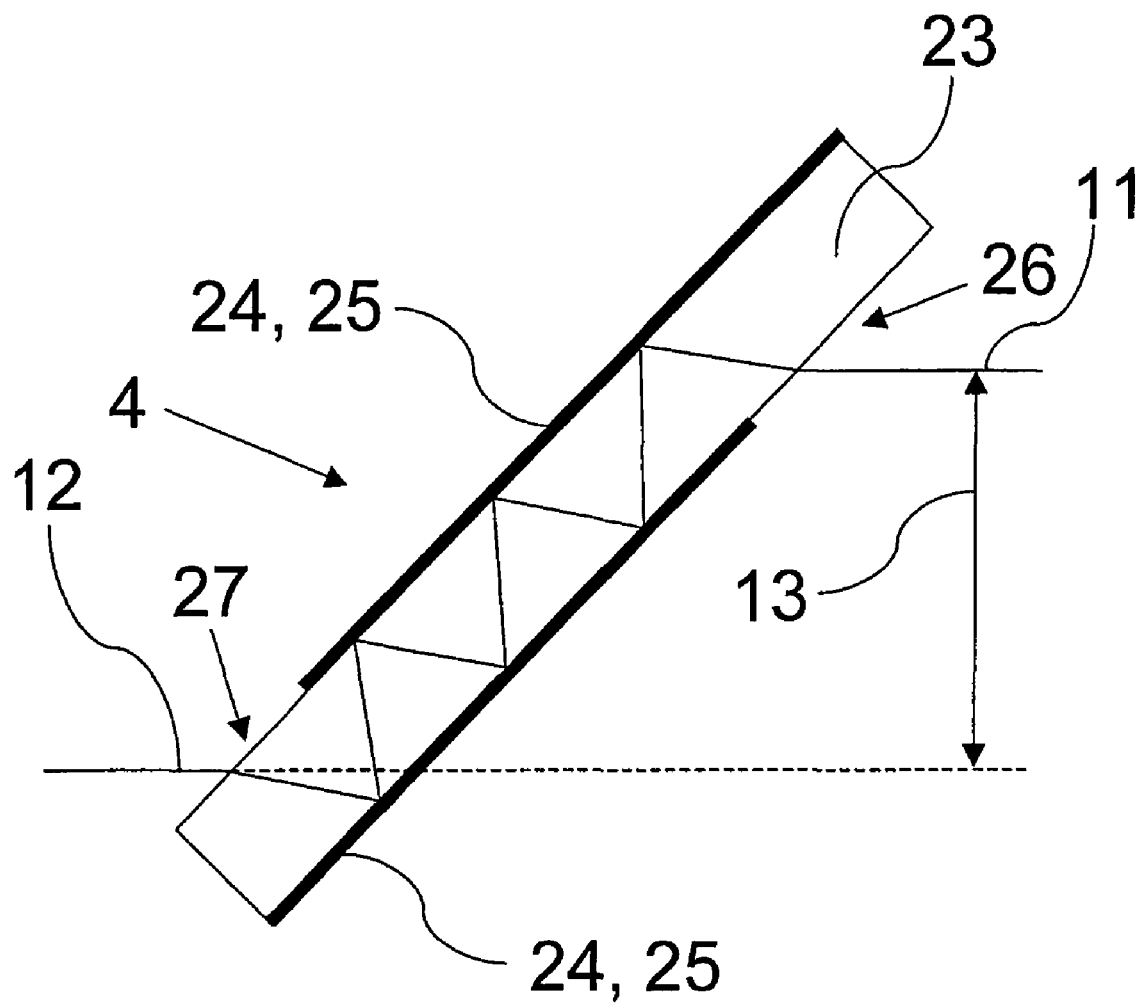
FIG. 7 shows a schematic representation of a further exemplary embodiment of a reflecting filter system according to the present invention.

FIG. 7 shows a further exemplary embodiment of a reflecting filter system 4, in which a transparent component 23 is used. In this reflecting filter system 4, an optical beam offset 13 between entering beam 11 and exiting beam 12 is implemented as well. Transparent component 23 has two boundary surfaces 24 which are provided with a reflective coating 25. The shape of transparent component 23 is selected such that the two boundary surfaces 24 are arranged parallel to each other. Transparent component 23 is made of quartz glass. At entrance surface 26 of transparent component 23, light of light source 3 (not shown in FIG. 7) enters the transparent component. After a total of six reflections in transparent component 23, the light which has now been selected with respect to the illumination wavelength range exits transparent component 23 at exit surface 27. Both entrance surface 26 and exit surface 27 are provided with an anti-reflective coating in order that the smallest possible amount of the light to be selected is reflected at entrance surface 26, i.e., does not enter transparent component 23. The anti-reflective coating of exit surface 27 is also designed in such a manner that the smallest possible amount of useful light is reflected internally, i.e., in transparent component 23. In this manner, loss of useful light due to unintended reflections is minimized.

In the beam path of reflecting filter system 4 shown in FIG. 3, provision is made for beam-shaping means 28 and 29. Beam-shaping means 28 and 29 are, on the one hand, a converging lens and, on the other hand, a diverging lens. In this manner, the position of the image of light source 3 is brought to the position that reflecting filter system 14 has in conjunction with light source 3.

A means for cooling 30 is provided in each of reflecting filter systems 4, 14 from FIGS. 3 and 4. This means for cooling 30 is arranged behind first reflecting filter 22, which reflects the light of the light source for the first time. Means for cooling 30 is designed to be passive and serves as a beam trap for the light that is not reflected by this reflecting filter.

Altogether, provision is made for four reflections at the four reflecting filters 22 of reflecting filter systems 4, 14 from FIGS. 3 and 4.

To conclude, it should be pointed out very particularly that the exemplary embodiments discussed above serve only to illustrate the claimed teaching without limiting the teaching to the exemplary embodiments.

LIST OF REFERENCE NUMERALS 1 illuminating device
2 DUV microscope
3 light source
4 reflecting filter system
5 beam of light from (3)
6 detector
7 beam splitter
8 microscope stage
9 object
10 objective lens
11 entering beam
12 exiting beam
13 optical beam offset
14 further reflection system
15 housing of (4), (14)
16 plate
17 axis of rotation
18 motor
19 housing of (3)
20 housing of further light sources
21 mechanical interface
22 reflecting filter
23 transparent component
24 boundary surface
25 reflective coating
26 entrance surface
27 exit surface
28 beam-shaping means
29 beam-shaping means
30 means for cooling

What is claimed is:

1. An illuminating device comprising:
a light source configured to provide a beam of light;
a housing;
a first reflecting filter system disposed in the housing and including at least four first reflecting notch filters configured to reflect light having a wavelength of 365 nm;
a second reflecting filter system disposed in the housing and including at least four second reflecting notch filters designed to reflect light having a wavelength of 248 nm; and
a plate disposed in the housing and configured to selectively, one at a time, bring the first reflecting filter system and the second reflecting filter system into the beam of light;
wherein each of the first and second reflecting filter systems is configured so that the beam of light undergoes at least four reflections in the respective reflecting filter system and an entering beam of the respective reflecting filter system has an optical beam offset relative to an exiting beam thereof the entering beam being parallel to the exiting beam.

2. The illuminating device as recited in claim 1 wherein the illuminating device is configured for use in a microscope.

3. The illuminating device as recited in claim 2 wherein the microscope is a UV microscope.

4. The illuminating device as recited in claim 1 wherein a respective angle of reflection is at least nearly the same for each of the at least four reflections.

5. The illuminating device as recited in claim 1 wherein the plate is rotatable so as to enable the selectively, one at a time, bringing the first reflecting filter system and the second reflecting filter system into the beam of light so as to select a wavelength of light of the light source.

6. The illuminating device as recited in claim 5 further comprising at least one of a mechanical and a motor-driven switching mechanism for rotating the plate.

7. The illuminating device as recited in claim 1 wherein the light source is disposed in the housing.

8. The illuminating device as recited in claim 7 wherein the housing has a standard mechanical interface.

9. The illuminating device as recited in claim 1 wherein the light propagates in an at least substantially collimated manner at least one of when in the reflecting filter system and when exiting the reflecting filter system.

10. The illuminating device as recited in claim 1, further comprising a beam-shaping device disposed in at least one of a beam path of at least one of the first and second reflecting filter systems and in the housing.

11. The illuminating device as recited in claim 10 wherein the beam-shaping device includes a lens.

12. The illuminating device as recited in claim 1 further comprising at least one of a passive and an active cooling device associated with at least one of the first and second reflecting filter systems.

13. A microscope comprising an illuminating device, the illuminating device comprising:
- a light source configured to provide a beam of light;
- a housing;
- a first reflecting filter system disposed in the housing and including at least four first reflecting notch filters configured to reflect light having a wavelength of 365 nm;
- a second reflecting filter system disposed in the housing and including at least four second reflecting notch filters designed to reflect light having a wavelength of 248 nm; and
- a plate disposed in the housing and configured to selectively, one at a time, bring the first reflecting filter system and the second reflecting filter system into the beam of light;
- wherein each of the first and second reflecting filter systems is configured so that the beam of light undergoes at least four reflections in the respective reflecting filter system and an entering beam of the respective reflecting filter system has an optical beam offset relative to an exiting beam thereof, the entering beam being parallel to the exiting beam.

14. The illuminating device as recited in claim 13 wherein the housing has a standard mechanical interface.

15. The microscope as recited in claim 13 wherein the microscope is at least one of a semiconductor inspection and a semiconductor measuring microscope.

* * * * *